US012809169B2

(12) United States Patent
Zhu et al.

(10) Patent No.: US 12,809,169 B2
(45) Date of Patent: Nov. 24, 2026

(54) SELECTIVE SENSOR ACTIVATION BASED ON MULTI-CHIRP FMCW RADAR

(71) Applicant: Microsoft Technology Licensing, LLC, Redmond, WA (US)

(72) Inventors: Ling Zhu, Palo Alto, CA (US); Josiah Smith, Washington, DC (US); Jouya Jadidian, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 18/642,435

(22) Filed: Apr. 22, 2024

(65) Prior Publication Data

US 2025/0328012 A1 Oct. 23, 2025

(51) Int. Cl.

| | |
|---|---|
| ***G02B 27/01*** | (2006.01) |
| ***G01S 13/536*** | (2006.01) |
| ***G01S 13/56*** | (2006.01) |
| ***G06T 7/20*** | (2017.01) |

(52) U.S. Cl.

CPC .......... *G02B 27/017* (2013.01); *G01S 13/536* (2013.01); *G01S 13/56* (2013.01); *G06T 7/20* (2013.01)

(58) Field of Classification Search

None

See application file for complete search history.

(56) References Cited

U.S. PATENT DOCUMENTS

| | | | | |
|---|---|---|---|---|
| 11,221,404 | B1 * | 1/2022 | DeSalvo | G06F 3/014 |
| 11,747,462 | B1 * | 9/2023 | DeSalvo | G06F 3/011<br>342/128 |
| 2016/0327633 | A1 * | 11/2016 | Kumar Y.B. | G01S 7/35 |
| 2017/0243478 | A1 * | 8/2017 | Tong | G08G 1/167 |
| 2018/0300897 | A1 * | 10/2018 | Woods | G06F 3/0481 |
| 2020/0025907 | A1 * | 1/2020 | Johnson | G06T 7/20 |
| 2021/0055385 | A1 * | 2/2021 | Rimini | G01S 7/417 |
| 2022/0283296 | A1 * | 9/2022 | Zhang | G01S 13/9027 |
| 2023/0090516 | A1 * | 3/2023 | Zhang | G01S 13/56<br>370/328 |
| 2024/0027608 | A1 * | 1/2024 | Kesaraju | G01S 7/415 |
| 2024/0155303 | A1 * | 5/2024 | Visser | H04R 5/027 |
| 2024/0406415 | A1 * | 12/2024 | Amini | G08B 29/188 |

* cited by examiner

*Primary Examiner* — Donna V Bocar

(74) *Attorney, Agent, or Firm* — Workman Nydegger

(57) ABSTRACT

A system may include a radar-based tracking system, an image-based tracking system, one or more processors, and one or more computer-readable recording media that store instructions that are executable by the one or more processors to configure the system to: (i) obtain, via the radar-based tracking system, radar-based measurement data; (ii) utilize the radar-based measurement data as input to an event detection module to generate event detection output; and (iii) when the event detection output satisfies one or more conditions, selectively activate the image-based tracking system to enable acquisition of image-based tracking data to facilitate positional tracking of an object.

20 Claims, 7 Drawing Sheets

300

400

500

SELECTIVE SENSOR ACTIVATION BASED ON MULTI-CHIRP FMCW RADAR

BACKGROUND

Mixed-reality (MR) systems, including virtual-reality and augmented-reality systems, have received significant attention because of their ability to create unique experiences for their users. For reference, conventional virtual-reality (VR) systems create a completely immersive experience by restricting their users' views to only a virtual environment. This is often achieved, in VR systems, through the use of a head-mounted display (HMD) that completely blocks any view of the real world. As a result, a user is entirely immersed within the virtual environment. In contrast, conventional augmented-reality (AR) systems create an augmented-reality experience by visually presenting virtual objects (via an HMD) that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

To facilitate MR experiences, many HMDs include various sensors that are used to track the position of the user. For example, many HMDs include image sensors or image-based tracking systems that are used to capture imagery of the surrounding environment and/or parts of the user's body (e.g., the user's hands, eyes, etc.). In some instances, HMDs include illumination components to illuminate user environments (or user body parts, such as eyes or hands) for image acquisition. Imagery captured by image sensors or image-based tracking systems an HMD may be processed in various ways to obtain information for facilitating an MR experience. Example processing may include depth processing, object segmentation, feature extraction or matching, and/or others. Information acquired based upon the imagery can enable HMDs to map the user's environment, track the position of the user (or the position of the HMD) within the environment, track movement of the user's hands or eyes, as well as perform other functions related to presenting realistic MR experiences.

The subject matter claimed herein is not limited to embodiments that operate only in environments such as those described above. Rather, this background is only provided to illustrate one example technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Figure 1:
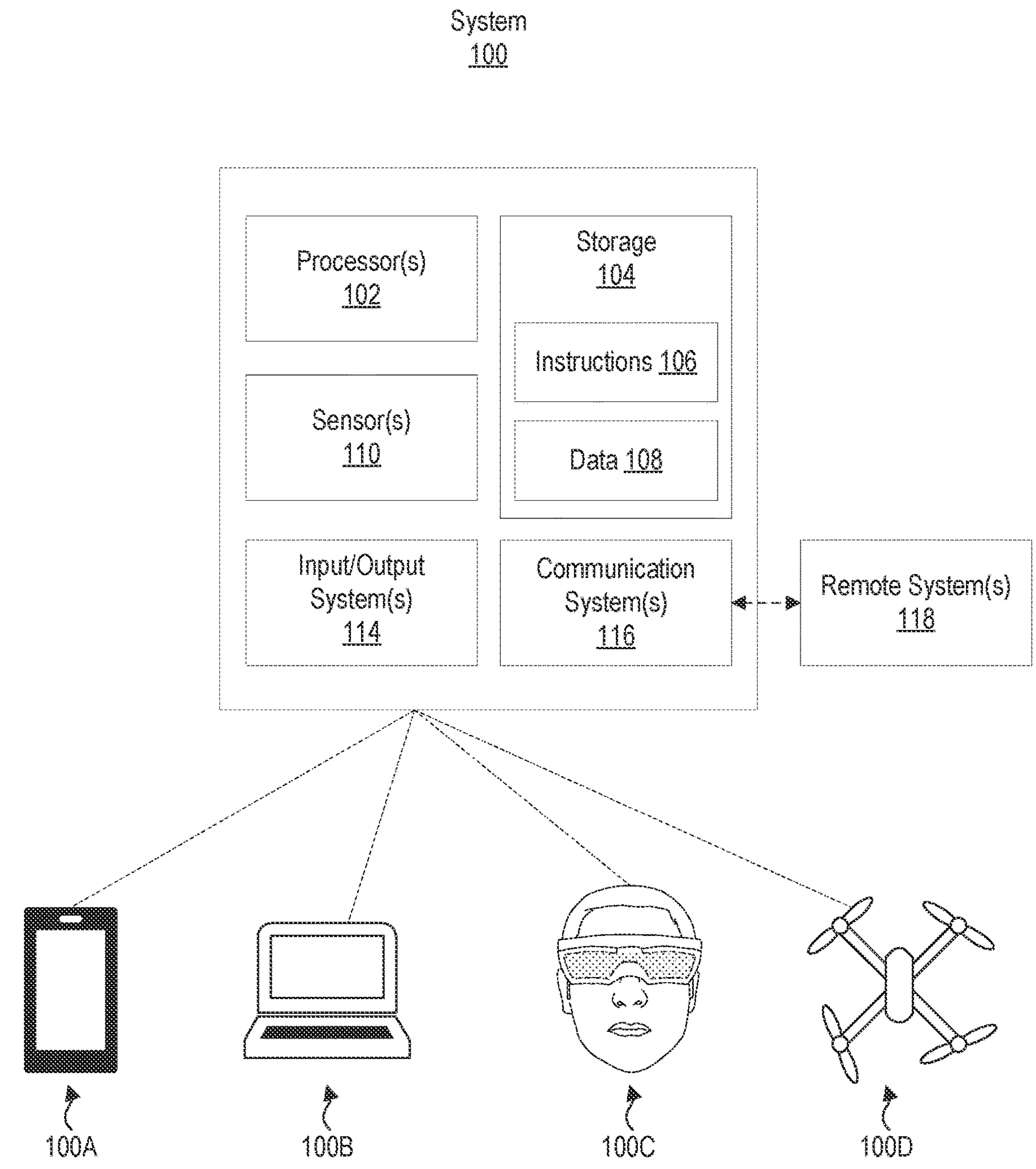
FIG. 1 illustrates example components of an example system that may include or be used to implement one or more disclosed embodiments.

Disclosed embodiments are generally directed to systems, methods, and apparatuses for facilitating selective sensor activation based on multi-chirp frequency modulated continuous wave (FMCW) radar.

As noted above, many HMDs include image sensors or other image-based tracking systems for capturing sensor data usable to facilitate MR experiences. However, many components of image-based tracking systems of HMDs (e.g., RGB cameras, IR cameras, low light cameras, thermal cameras, SPAD cameras, cameras of other modalities, illuminators/emitters, etc.) have high power consumption rates. Many conventional HMDs have such components of image-based tracking systems running constantly during user operation, which can cause numerous problems, such as excessive heat generation, reduced battery life, design constraints to account for the foregoing, etc.

Radar-based tracking systems are often associated with lower cost, lower power consumption, smaller form factor, and wider fields of view less affected by visual occlusions relative to image-based tracking systems. Radar-based tracking systems can thus be beneficially incorporated into HMDs (or other devices) to facilitate selective activation of other sensor/tracking systems of the HMD (or other device).

For instance, a radar-based tracking system on an HMD can acquire radar-based measurement data during device operation. The radar-based measurement data can be processed by an event detection module to generate event detection output. The event detection output can indicate whether certain events or states have occurred, are occurring, or are likely to occur in the future. For instance, the event detection output can indicate pose or pose changes in one or more body structures of a user (e.g., shoulders, arms, elbows, hands, legs, feet), such as whether the body structure(s) of the user are moving, are positioned within or near a range of perception of other sensor/tracking systems of the HMD, or are moving toward the range of perception of the other sensor/tracking systems of the HMD.

Continuing with the above example, when the event detection output satisfies predefined conditions (e.g., indicating that the body structure(s) of the user are moving, are positioned within or near a range of perception of other sensor/tracking systems of the HMD, or are moving toward the range of perception of the other sensor/tracking systems of the HMD), the HMD may selectively activate the other sensor/tracking systems of the HMD, such as image-based tracking systems. Such functionality may achieve significant power savings and/or improved user experiences by allowing systems to refrain from expending power and/or computational resources on certain sensor/tracking systems (e.g., image-based tracking systems) when objects of interest (e.g., user body structure(s)) are not visible, while still providing seamless user experiences by selectively activating such sensor/tracking systems when appropriate.

In some embodiments, radar-based tracking systems implementable on HMDs (or other devices) can comprise or implement FMCW radar sensors to achieve the functionality described herein. A single radar may utilize different FMCW chirps with different bandwidths for tracking body structures or objects at different ranges of distance. In one example, an FMCW signal may include a high-bandwidth chirp and a low-bandwidth chirp, and the high-bandwidth chirp may comprise a lower transmission power than the low-bandwidth chirp. In some instances, an HMD with a multi-chirp FMCW radar system as disclosed herein may track closer objects (e.g., hands, arms, elbows, shoulders) with high accuracy utilizing the high-bandwidth component/chirp of the radar signal. The HMD may similarly leverage the low-bandwidth component/chirp of the FMCW radar signal to track legs, knees, feet, floors, and/or other objects that are further from the HMD with sufficient accuracy for body tracking applications.

Although many of the examples described herein focus, in at least some respects, on radar systems implemented on HMDs, the principles described herein related to selective sensor activation based on multi-chirp FMCW radar signals may be applied in other contexts (e.g., on autonomous vehicles and/or other types of systems). Furthermore, although many examples described herein focus, in at least some respects, on selectively activating image-based tracking systems based on radar signals, other types of components may be selectively activated based on radar signals in accordance with the presently disclosed subject matter (e.g., LIDAR sensors, processing modules, and/or others).

Having just described some of the various high-level features and benefits associated with the disclosed embodiments, attention will now be directed to the Figures, which illustrate various conceptual representations, architectures, methods, and supporting illustrations related to the disclosed embodiments.

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory or computer-readable recording media and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more radar sensors (as will be described in more detail hereinbelow), image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices (e.g., self-driving vehicles). A system 100 may take on other forms in accordance with the present disclosure.

Selective Sensor Activation Based on Multi-Chirp FMCW Radar

Figure 2A:
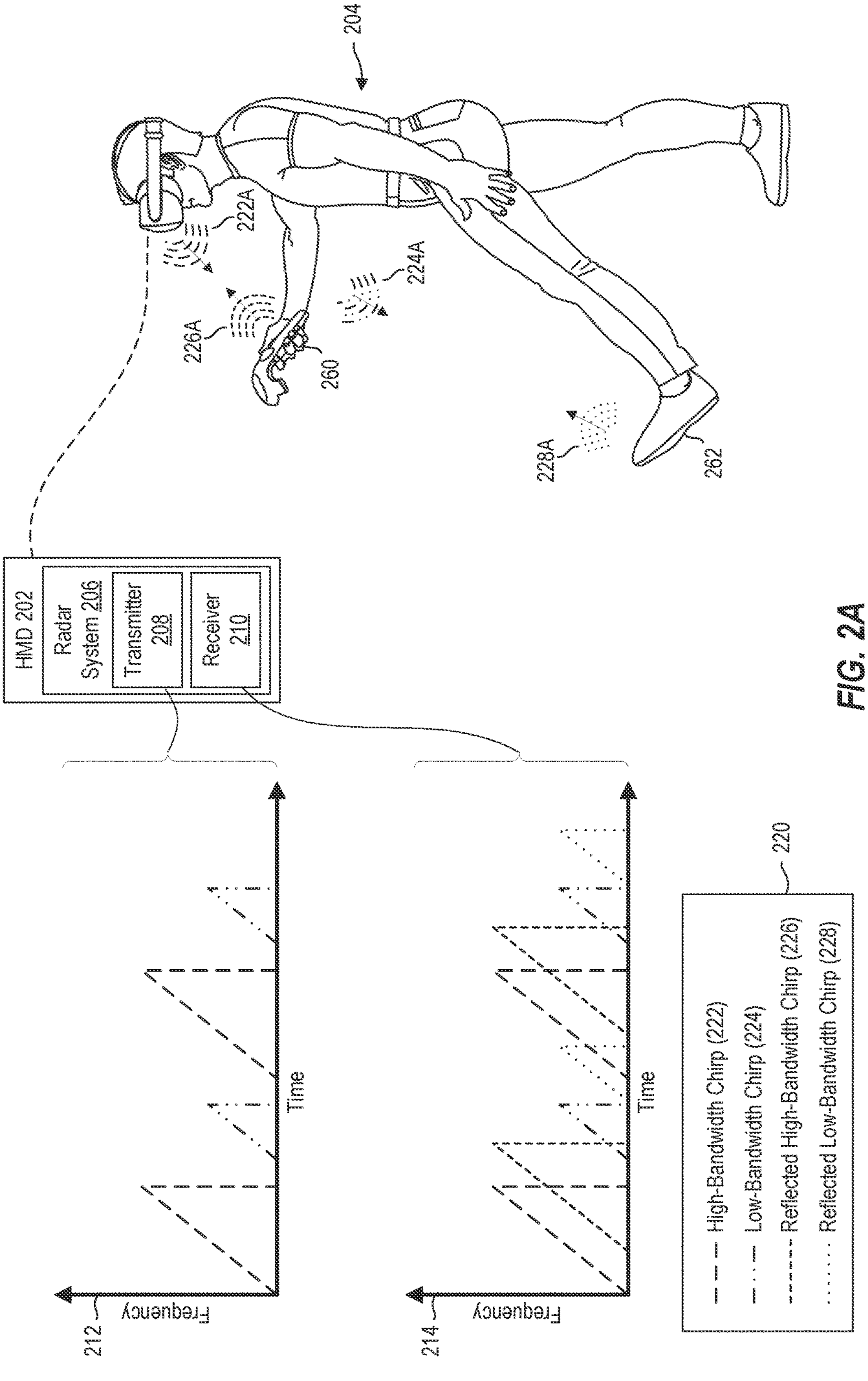
FIG. 2A illustrates a user operating an HMD that includes a radar system emitting a multi-chirp frequency modulated continuous wave (FMCW) radar signal.

FIG. 2A illustrates a user 204 operating an HMD 202 (e.g., corresponding to system 100) that includes a radar system 206 (e.g., corresponding to sensor(s) 110). The radar system 206 is also referred to herein as a "radar-based tracking system". FIG. 2A indicates that the radar system 206 includes at least a transmitter 208 configured to emit radar signals and a receiver 210 configured to detect reflected radar signals (e.g., after reflection off of objects within proximity to the transmitter 208). In some implementations, the transmitter(s) 208 and the receiver(s) 210 of a radar system 206 are arranged coplanar to one another.

One will appreciate, in view of the present disclosure, that the HMD 202 (or any system) may comprise any number of radar systems 206, and a radar system 206 may comprise any number of transmitters 208 and/or any number of receivers 210. For instance, an HMD 202 can include multiple radar systems 206, and each radar system 206 can be associated with a respective detection region or field of view. In one example, the HMD 202 may include a first radar system 206 with first transmitter(s) 208 and receiver(s) 210 and a second radar system 206 with second transmitter(s) 208 and receiver(s) 210. The first and second radar systems 206 may be tilted downward (with respect to the horizontal plane of the HMD 202). The HMD 202 may further comprise a third radar system 206 with third transmitter(s) 208 and receiver(s) 210 and a fourth radar system 206 with fourth transmitter(s) 208 and receiver(s) 210. The third and fourth radar system 206 may be tilted upward (with respect to the horizontal plane of the HMD 202). In the foregoing example, the first and second radar systems 206 can have different horizontal tilts (e.g., with respect to the vertical plane of the HMD 202), and the third and fourth radar systems 206 can have different horizontal tilts (e.g., with respect to the vertical plane of the HMD 202). In some instances, separate radar systems 206 may comprise at least partially overlapping fields of view or detection regions.

In the example of FIG. 2A, the radar system 206 comprises an FMCW radar system, and the transmitter 208 is configured to emit an FMCW radar signal. Graph 212 of FIG. 2A provides a simplified representation of aspects of multi-chirp FMCW radar signals that the radar system 206 may be configured to emit (e.g., via the transmitter 208). In particular, the multi-chirp FMCW radar signal represented in graph 212 includes a high-bandwidth chirp 222 (represented in FIG. 2A with dashed lines, see legend 220) and a low-bandwidth chirp 224 (represented in FIG. 2A with dash-dot-dot lines, see legend 220). One will appreciate that the particular form of the radar signal depicted in FIG. 2A is provided by way of example only and is not limiting of the principles described herein. Furthermore, a multi-chirp FMCW radar signal may include any number of chirps with different bandwidths (e.g., three or more chirps), in accordance with the present disclosure.

As shown in FIG. 2A, the high-bandwidth chirp 222 and the low-bandwidth chirp 224 are interleaved to form the multi-chirp FMCW radar signal of graph 212. Although graph 212 illustrates interleaving of single high-bandwidth chirps with single low-bandwidth chirps, any number of high-bandwidth chirps or low-bandwidth chirps may be emitted consecutively. In this regard, a multi-chirp FMCW radar signal may comprise sets of one or more of high-bandwidth chirps that are interleaved with sets of one or more low-bandwidth chirps.

The high-bandwidth chirp 222 comprises a higher bandwidth of frequencies than the low-bandwidth chirp 224 (as indicated in graph 212 by the high-bandwidth chirp 222 extending across a greater frequency space than the low-bandwidth chirp 224). For instance, in one example, the high-bandwidth chirp 222 comprises a bandwidth of about 6.8 GHZ, and/or the low-bandwidth chirp 224 comprises a bandwidth of about 3.4 GHz. Other bandwidth configurations are within the scope of the present disclosure, such as, by way of non-limiting example, the high-bandwidth chirp 222 comprising a bandwidth greater than about 7 GHz with the low-bandwidth chirp 224 comprising a bandwidth lesser than about 7 GHZ, the high-bandwidth chirp 222 comprising a bandwidth greater than about 6 GHz with the low-bandwidth chirp 224 comprising a bandwidth lesser than about 6 GHZ, the high-bandwidth chirp 222 comprising a bandwidth greater than about 5 GHz with the low-bandwidth chirp 224 comprising a bandwidth lesser than about 5 GHZ, the high-bandwidth chirp 222 comprising a bandwidth greater than about 4 GHZ with the low-bandwidth chirp 224 comprising a bandwidth lesser than about 4 GHZ, the high-bandwidth chirp 222 comprising a bandwidth greater than about 3 GHz with the low-bandwidth chirp 224 comprising a bandwidth lesser than about 3 GHZ, and/or other configurations. In some instances, both the high-bandwidth chirp 222 and the low-bandwidth chirp 224 have bandwidths greater than about 7 GHZ, or both the high-bandwidth chirp 222 and the low-bandwidth chirp 224 have bandwidths lesser than about 3 GHz (with the high-bandwidth chirp 222 continuing to have a greater bandwidth than the low-bandwidth chirp 224). In some implementations, the high-bandwidth chirp 222 has a bandwidth greater than about 7 GHZ, and the low-bandwidth chirp 224 has a bandwidth lesser than about 3 GHz.

FIG. 2A conceptually depicts the radar system 206 of the HMD 202 emitting a multi-chirp FMCW radar signal (e.g., corresponding to the signal shown in graph 212). In particular, FIG. 2A conceptually depicts the radar system 206 of the HMD 202 emitting the high-bandwidth chirp 222 (e.g., high-bandwidth chirp 222A propagating away from the HMD 202). Similarly, FIG. 2A conceptually depicts the radar system 206 of the HMD 202 emitting the low-bandwidth chirp 224 (e.g., low-bandwidth chirp 224A propagating away from the HMD 202).

As indicated above, the radar system 206 may utilize the transmitter 208 to emit the multi-chirp FMCW radar signal. In some instances, each transmitter 208 of the radar system 206 is individually configured to emit a multi-chirp FMCW radar signal. In this regard, each individual radar transmitter 208 of a radar system 206 (or of an HMD 202) may be individually configured to emit both a high-bandwidth chirp 222 and a low-bandwidth chirp 224 of a multi-chirp FMCW radar signal (e.g., in contrast with existing systems that use multiple radar bandwidths, where each transmitter is configured to emit a single, respective bandwidth). In some instances, the transmitter 208 of a radar system 206 is configured to emit the multi-chirp FMCW radar signal at the firmware level (which may contribute to power-efficient operation of the transmitter).

In some implementations, the high-bandwidth chirp 222 may be emitted by the transmitter 208 with a lower transmission power than the low-bandwidth chirp 224 during interleaved transmission of the high-bandwidth chirp 222 and the low-bandwidth chirp 224. Although the reduced transmission power for the high-bandwidth chirp 222 can reduce its sensor range, the high-bandwidth chirp 222 may still be usable to detect nearby objects with high precision (e.g., the elevated hand 260 of the user 204).

In some instances, the low-bandwidth chirp 224 may be emitted by the transmitter 208 with a higher transmission power than the high-bandwidth chirp 222. The relatively higher transmission power for the low-bandwidth chirp 224 can provide increased sensor range (e.g., relative to that of the high-bandwidth chirp 222), which can make the low-bandwidth chirp usable to detect more distant objects with sufficient precision (e.g., the foot 262 of the user 204).

In view of the foregoing, in some instances, the low-bandwidth FMCW radar signals (operating with relatively higher power) may be utilized to detect pose data for distant objects (e.g., positioned further than about one meter from the radar system, such as legs or feet of a user), and the high-bandwidth FMCW radar signals may be utilized to detect pose data for nearer objects (e.g., positioned closer than about one meter from the radar system, such as shoulders, elbows, hands, or arms of a user).

FIG. 2A conceptually depicts a reflected high-bandwidth chirp 226A propagating toward the HMD 202 and the radar system 206. The reflected high-bandwidth chirp 226A of FIG. 2A comprises a reflection of the high-bandwidth chirp 222A off of an object in the scene (e.g., off of the hand 260 of the user 204). Similarly, FIG. 2A conceptually depicts a reflected low-bandwidth chirp 228A propagating toward the HMD 202 and the radar system 206. The reflected low-bandwidth chirp 228A comprises a reflection of the low-bandwidth chirp 224A off of an object in the scene (e.g., off of the foot 262 of the user 204).

In the example of FIG. 2A, the reflected high-bandwidth chirp 226A and the reflected low-bandwidth chirp 228A are detected by the receiver 210 of the radar system 206. Graph 214 of FIG. 2A provides a simplified representation of aspects of reflected multi-chirp FMCW radar signals that the receiver 210 of the radar system 206 may be configured to detect. In particular, graph 214 depicts a reflected high-bandwidth chirp 226 (represented in FIG. 2A with half dash lines, see legend 220) and a reflected low-bandwidth chirp 228 (represented in FIG. 2A with dotted lines, see legend 220).

Graph 214 also depicts the high-bandwidth chirp 222 to illustrate the temporal offset between the emission of the high-bandwidth chirp 222 and the detection of the reflected high-bandwidth chirp 226. Similarly, graph 214 also depicts the low-bandwidth chirp 224 to illustrate the temporal offset between the emission of the low-bandwidth chirp 224 and the detection of the reflected low-bandwidth chirp 228. For ease of illustration and explanation, other transformations to the reflected chirps (e.g., relative to the emitted chirps) are omitted in FIG. 2A.

Figure 2B:
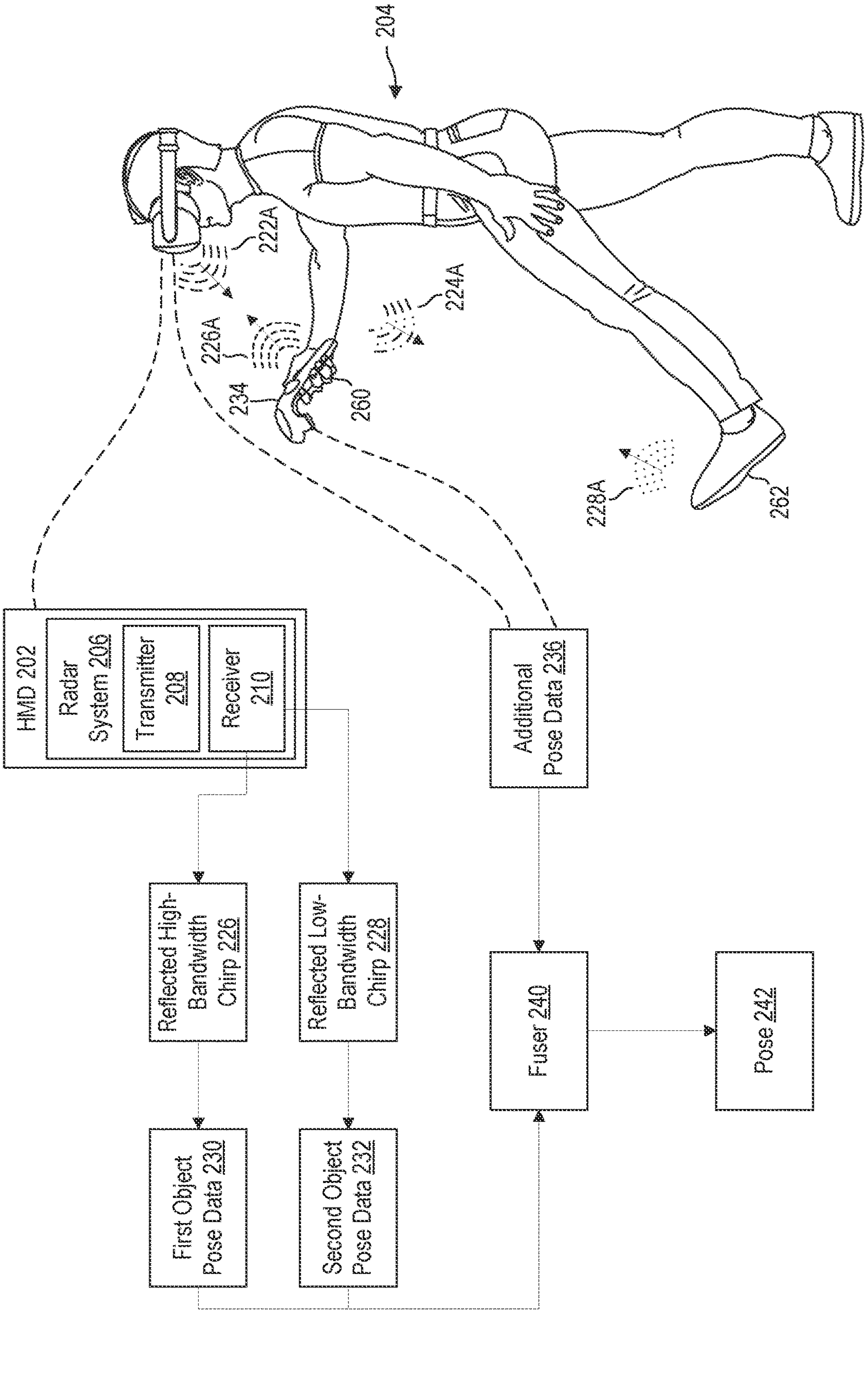
FIG. 2B illustrates a conceptual representation of determining pose information based on the reflected high-bandwidth chirp and the reflected low-bandwidth chirp.

A system (e.g., the HMD 202 or radar system 206) may utilize the differences between the reflected chirps and the emitted chirps (e.g., temporal shifts, frequency shifts) of the multi-chirp FMCW radar signal to determine pose information for objects in the scene, which may be used to facilitate selective sensor activation and/or deactivation. FIG. 2B illustrates a conceptual representation of the receiver 210 having detected the reflected high-bandwidth chirp 226 and the reflected low-bandwidth chirp 228 (as indicated by the arrows extending from the receiver 210 toward the reflected high-bandwidth chirp 226 and the reflected low-bandwidth chirp 228).

The radar system 206 (or the HMD 202) may utilize signal characteristics of the reflected high-bandwidth chirp 226 (and signal characteristics of the high-bandwidth chirp 222 that was initially emitted) to determine first object pose data 230 (e.g., using range doppler and/or other radar positioning and/or signal disambiguation techniques). The first object pose data 230 indicates position and/or motion attributes for one or more objects in the scene that the reflected high-bandwidth chirp 226 reflected off of. In the example of FIGS. 2A and 2B, the reflected high-bandwidth chirp 226 reflects off of the hand 260 of the user 204. Thus, in the example of FIG. 2B, the first object pose data 230 represents position and/or motion attributes of the hand 260 of the user 204.

Similarly, radar system 206 (or the HMD 202) may utilize signal characteristics of the reflected low-bandwidth chirp 228 (and signal characteristics of the low-bandwidth chirp 224 that was initially emitted) to determine second object pose data 232, indicating position and/or motion attributes for objects in the scene that the reflected low-bandwidth chirp 228 reflected off of. In the example of FIGS. 2A and 2B, the reflected low-bandwidth chirp 228 reflects off of the foot 262 of the user 204. Thus, in the example of FIG. 2B, the second object pose data 232 represents position and/or motion attributes of the foot 262 of the user 204.

Although the first object pose data 230 and the second object pose data 232 are associated with particular objects in the example of FIG. 2B, one will appreciate that components of a reflected multi-chirp FMCW radar signal (e.g., the reflected high-bandwidth chirp 226 and the reflected low-bandwidth chirp 228) may be utilized to detect pose data for any type and/or number of objects. For instance, the first object pose data 230 may indicate position and/or motion attributes of the shoulders or elbows of the user 204 (and/or of environment objects such as walls). As another example, the second object pose data 232 may indicate position and/or motion attributes of the legs or knees of the user 204 (and/or of environment objects such as floors). Furthermore, as noted above, the principles discussed herein may be applied on other types of devices aside from HMDs. For instance, a radar system employing multi-chirp FMCW radar signals may be implemented on an autonomous vehicle to enable multi-range object detection, such that the vehicle's radar system is able to resolve mid-range objects with high resolution and very far targets with lower resolution (within the same operational frames).

In some implementations, the pose data obtained using the radar system 206 (e.g., the first object pose data 230 and/or the second object pose data 232) may be used in combination with additional pose data obtained by an overarching system (e.g., the HMD 202). FIG. 2B depicts additional pose data 236 that may be obtained from one or more other sensor(s) 110 of the HMD 202. For instance, the HMD 202 may include image-based pose detection systems (e.g., cameras and/or processing modules for performing simultaneous localization and mapping (SLAM), eye tracking, hand tracking, etc.) as indicated in FIG. 2B by the dashed line extending from the HMD 202 toward the additional pose data 236. As another example, the HMD 202 may be associated with one or more inertial tracking systems (inertial measurement units (IMUs)), which may be positioned on the HMD 202 and/or on peripheral devices (e.g., on a controller 234). Such inertial tracking systems may additionally or alternatively give rise to additional pose data 236 (as indicated in FIG. 2B by the dashed line extending from the controller 234 to the additional pose data 236).

FIG. 2B furthermore illustrates an example in which the additional pose data 236 is fused with the first object pose data 230 and/or the second object pose data 232 via a fuser

240 to obtain a composite pose 242. For example, the pose 242 may comprise a full-body pose for the user 204, with different aspects of the full-body pose being based upon pose data contributions from different sensors. The fuser 240 may comprise one or more jointly optimized AI modules trained on multiple types of input pose data (e.g., radar-based pose data, image-based pose data, IMU-based pose data) with ground truth of true poses.

As noted above, a radar system 206 may be configured for power-efficient operation while emitting and/or detecting a multi-chirp FMCW signal. In some examples, a transmitter 208 of a radar system 206 consumes less than 10 milliwatts to emit a multi-chirp FMCW radar signal (or less than 5 milliwatts). In some instances, a radar system 206 that emits a multi-chirp FMCW radar signal consumes more than 10 milliwatts.

In some implementations, other tracking systems of an HMD 202 (or other overarching system on which a radar system 206 is implemented) consume more power than the radar system 206. For example, in MR HMDs, image-based tracking systems (e.g., hand tracking systems) and/or processing modules can consume hundreds of milliwatts of power while functioning (e.g., to power image sensors, illuminators, object segmentation and/or other modules, etc.). Thus, in some instances, pose data obtained via a radar system 206 may be utilized to facilitate selective activation and/or deactivation of other tracking systems and/or components. Such functionality can enable power savings for HMDs and/or other systems, while still maintaining tracking functionality at critical times to provide desirable user experiences.

Figure 2C:
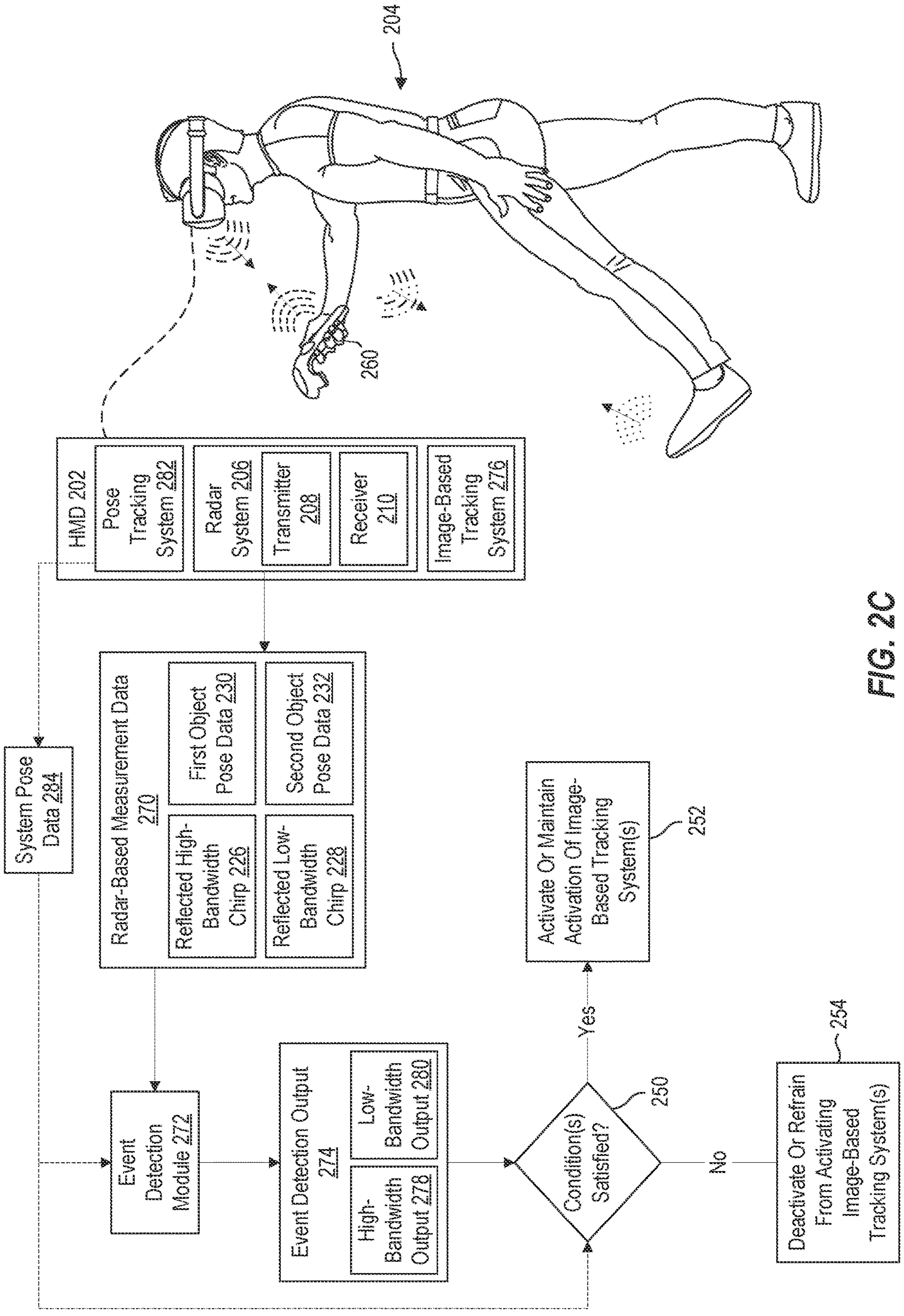
FIG. 2C illustrates a conceptual representation of selectively activating an additional tracking system multi-chirp FMCW radar.

FIG. 2C illustrates a conceptual representation of selectively activating an additional tracking system based on multi-chirp FMCW radar. In the example shown in FIG. 2C, the HMD 202 includes an image-based tracking system 276. The image-based tracking system 276 of the HMD 202 can comprise one or more image sensors (e.g., RGB cameras, IR cameras, low light cameras, thermal cameras, SPAD cameras, cameras of other modalities) and/or componentry associated therewith (e.g., illuminators/emitters, power control/supply modules, processing modules, etc.). An HMD 202 can include any quantity of image-based tracking system 276 that may be selectively activated based on multi-chirp FMCW radar, as described herein.

FIG. 2C conceptually depicts radar-based measurement data 270, which can include or be based on the reflected multi-chirp FMCW radar signal detected by the receiver 210. For instance, the radar-based measurement data 270 can comprise the reflected high-bandwidth chirp 226 and/or the reflected low-bandwidth chirp 228 (when such reflections are detected) or information generated based thereon, such as the first object pose data 230 and/or the second object pose data 232 (respectively). The radar-based measurement data 270 can comprise data points collected over time (e.g., to capture changes in pose). In some implementations, the radar-based measurement data 270 is based on detected signals from a plurality of radar systems of the HMD 202 (e.g., radar-based tracking systems associated with different detection regions).

FIG. 2C also conceptually depicts utilization of the radar-based measurement data 270 as input to an event detection module 272 (indicated in FIG. 2C by the arrow extending from the radar-based measurement data 270 to the event detection module 272). The event detection module 272 can be configured to process the radar-based measurement data 270 to provide event detection output 274. The event detection output 274 can indicate whether certain events or states that are possible for the object(s) being tracked via the radar system 206 are present. For example, continuing with the example where the objects being tracked are the hand 260 and the foot 262 of the user 204, the event detection output 274 can indicate whether the hand 260 and/or the foot 262 of the user 204 is/are moving (e.g., changing pose), is/are within or near the range of perception the image-based tracking system 276 of the HMD 202, or is/are moving toward or approaching the range of perception of the image-based tracking system 276 of the HMD 202. Other states/events are within the scope of the present disclosure, and the foregoing are provided by way of example only.

The event detection module 272 can generate the event detection output 274 in various ways, such as by extracting features from the radar-based measurement data 270 to determine whether the events/states of interest are present/indicated for the sensed object(s) (e.g., the body structure(s) of the user 204, such as the hand 260 or the foot 262). As another example, the event detection module 272 can apply a rule-based framework to the radar-based measurement data 270 to determine whether the events/states of interest are present/indicated for the sensed object(s). As yet another example, the event detection module 272 can comprise one or more machine learning models (e.g., decision trees, support vector machines, neural networks, etc.) trained on labeled data to recognize patterns indicative of whether the events/states of interest are present/indicated for the sensed object(s). The event detection module 272 may be implemented in various other ways or combinations of ways to provide the event detection output 274 (e.g., signal processing algorithms, time-series analysis modules, statistical models, anomaly detection algorithms, etc.).

FIG. 2C conceptually depicts the HMD 202 determining whether the event detection output 274 (or one or more components thereof) satisfies one or more conditions (indicated in FIG. 2C by decision block 250). As shown in FIG. 2C, in response to determining that the event detection output 274 satisfies the condition(s), the HMD 202 may selectively activate or maintain activation of the image-based tracking system 276 (indicated in FIG. 2C by action block 252, with the "Yes" arrow extending from decision block 250 to action block 252).

When activated, the image-based tracking system 276 may obtain image-based tracking data to facilitate positional tracking of objects within the range of perception of the image-based tracking system 276. For instance, in one example, the image-based tracking system 276 may comprise image sensors and/or processing modules of the HMD 202 for performing hand tracking (e.g., a hand tracking system). The event detection output 274 may indicate position and/or motion characteristics, events, or states of the hand 260 of the user 204. The condition(s) associated with decision block 250 may include the position of the hand 260 of the user 204 being within the range of perception of the hand tracking system (e.g., within a field of view of the image sensors of the hand tracking system). Additional or alternative conditions for selectively activating the hand tracking system may include the position of the hand 260 of the user 204 being within proximity to the range of perception of the hand tracking system (e.g., within about one foot (or more or less) of the field of view of the image sensors of the hand tracking system), or the position of the hand 260 of the user 204 approaching the range of perception of the hand tracking system, or simply movement of the hand 260. Conditions (and/or others) may be combined and/or weighted as appropriate.

In some instances, the condition(s) associated with decision block 250 rely on information associated with other devices and/or sensor systems (e.g., an orientation of the HMD 202, a user gaze direction, a user field of view, inertial tracking data of the HMD or a controller 234 being held by the hand 260, etc.).

In response to determining that the event detection output 274 fails to satisfy the conditions associated with decision block 250, the HMD 202 may selectively deactivate or refrain from activating the image-based tracking system 276 (indicated in FIG. 2C by action block 254, with the "No" arrow extending from decision block 250 to action block 254).

In the example shown in FIG. 2C, the event detection output 274 can comprise high-bandwidth event detection output 278 and low-bandwidth event detection output 280. The high-bandwidth event detection output 278 can be generated by processing the reflected high-bandwidth chirp 226 (and/or the first object pose data 230), whereas the low-bandwidth event detection output 280 can be generated by processing the reflected low-bandwidth chirp 228 (and/or the second object pose data 232). In this regard, in some implementations, the event detection module 272 can comprise one or more modules that can process the reflected high-bandwidth chirp 226 and the reflected low-bandwidth chirp 228 separately (e.g., in parallel, or in series) to provide the high-bandwidth event detection output 278 and the low-bandwidth event detection output 280.

The high-bandwidth event detection output 278 and the low-bandwidth event detection output 280 can comprise an indication of applicable events or states for different objects or for at least partially overlapping sets of one or more objects. For instance, the high-bandwidth event detection output 278 can be associated with events/states for one or more shoulders, elbows, or hands of the user, whereas the low-bandwidth event detection output 280 can be associated with events/states for one or more legs or feet of the user.

As an illustrative example, both the reflected high-bandwidth chirp 226 and the reflected low-bandwidth chirp 228 may capture reflections from the hand 260 of the user 204, and the high-bandwidth event detection output 278 and the low-bandwidth event detection output 280 may both indicate estimated events/states for the hand 260, which may be assessed relative to the condition(s) (see decision block 250) to determine whether to modify the activation state of the image-based tracking system 276.

As another example, the reflected low-bandwidth chirp 228 may capture reflections from the foot 262, whereas the reflected high-bandwidth chirp 226 may fail to capture such reflections. Thus, the low-bandwidth event detection output 280 may indicate an estimated event/state for the foot 262, which may be assessed relative to the condition(s) (see decision block 250) to determine whether to modify the activation state of the image-based tracking system 276.

In some instances, analysis of the high-bandwidth event detection output 278 and the low-bandwidth event detection output 280 can be performed to facilitate modification or maintenance of the activation state of the same image-based tracking system 276 or of different image-based tracking systems of the HMD 202 (or other device). For instance, an indication of a state/event for the hand 260 represented by the high-bandwidth event detection output 278 may trigger activation of a hand tracking system, whereas an indication of a state/event for the foot 262 represented by the low-bandwidth event detection output 280 may trigger activation of a different image-based tracking system (or operation of the hand tracking system under different parameters).

In the example shown in FIG. 2C, the HMD 202 includes a pose tracking system 282, which may be operable to obtain system pose data 284 of the HMD 202. For example, the pose tracking system 282 can comprise a SLAM system (e.g., utilizing one or more cameras and/or one or more IMUs) that generates system pose data 284 in the form of 6-degree-of-freedom (6-DOF) pose data for the HMD 202. As another example, the pose tracking system 282 may simply comprise an IMU that generates data 284 in the form of 3-degree-of-freedom (3-DOF) pose data for the HMD 202. The pose tracking system 282 of the HMD 202 can take on various forms in accordance with the disclosed principles. In some implementations, the pose tracking system 282 may be associated with a lesser power consumption than the image-based tracking system 276.

FIG. 2C conceptually depicts an example in which the system pose data 284 is additionally used as input to the event detection module 272 to generate the event detection output 274 (as indicated in FIG. 2C by the dashed arrow extending from the system pose data 284 to the event detection module 272). For instance, the system pose data 284 may operate as an indication of the range of perception of the image-based tracking system 276, which may inform the event detection output 274 generated by the event detection module 272 (e.g., whether a detected object is within the range of perception of the image-based tracking system 276). In some implementations, the system pose data 284 can be used to define the condition(s) against which the event detection output 274 is compared to determine whether to modify or maintain the activation state of the image-based tracking system 276 (as indicated in FIG. 2C by the dashed arrow extending from the system pose data 284 to the decision block 250).

As noted above, power consumption associated with the radar system 206 and/or the pose tracking system 282 may be less than power consumption associated with the image-based tracking system 276 that can be selectively activated (or deactivated) based on the radar-based measurement data 270 obtained via the radar system 206. The selective activation and/or deactivation of the image-based tracking system 276 using the radar-based measurement data 270 obtained by the radar system 206 may thus facilitate power savings by enabling the image-based tracking system 276 to remain in an inactive state when not needed for user experiences (e.g., when the user's hands are not in view and therefore need not be tracked in a granular, fully articulated manner).

Although at least some examples discussed herein with reference to FIG. 2C have focused on selectively activating and/or deactivating a hand tracking system, radar-based measurement data 270 obtained using multi-chirp FMCW radar signals may be utilized to facilitate selective activation and/or deactivation of other types of image-based tracking system 276, in accordance with implementations of the present disclosure.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 3:
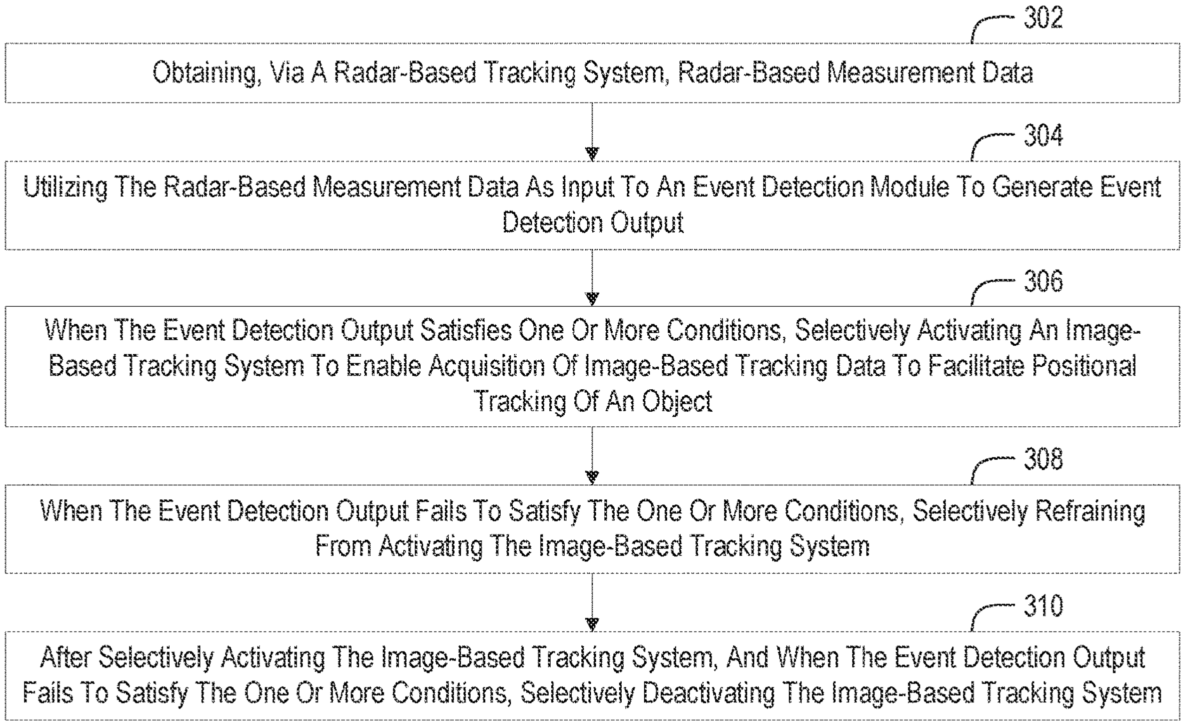
FIGS. 3, 4, and 5 illustrate example flow diagrams depicting acts associated with selective sensor activation based on multi-chirp FMCW radar.
Figure 4:
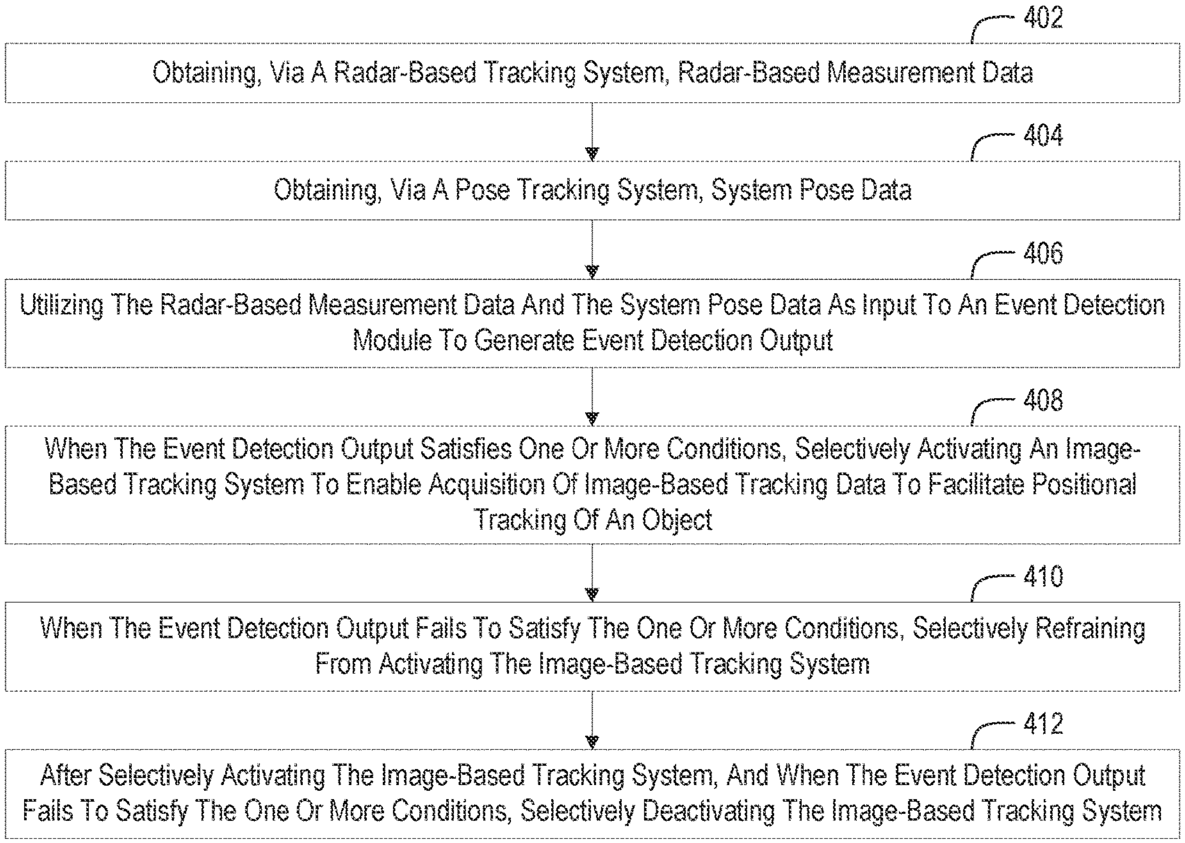
Figure 5:
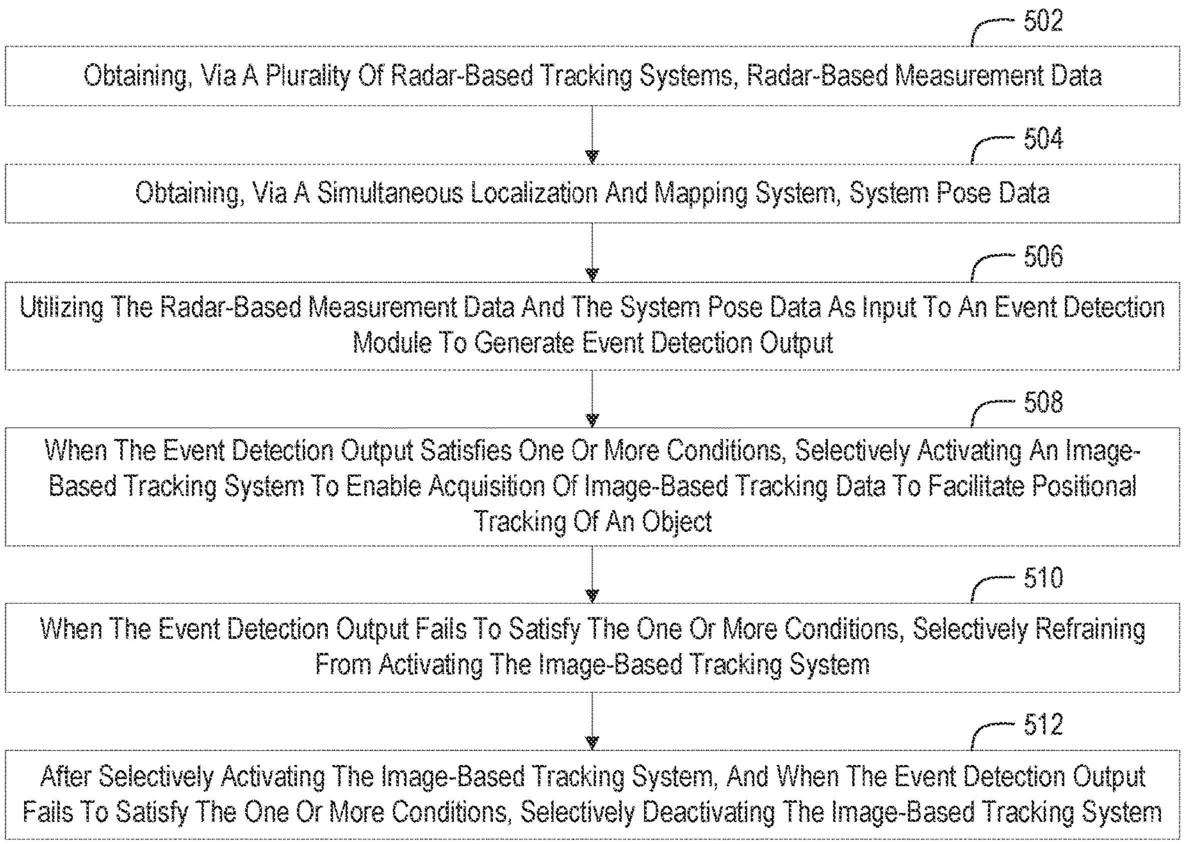

FIGS. 3, 4 and 5 illustrate example flow diagrams 300, 400, and 500, respectively, depicting acts associated with selective sensor activation based on multi-chirp FMCW radar. The acts of flow diagrams 300, 400, and 500 may be performed utilizing one or more components of one or more systems (e.g., system 100, HMD 202, radar system 206, etc.).

Act 302 of flow diagram 300 of FIG. 3 includes obtaining, via a radar-based tracking system, radar-based measurement data. In some instances, the radar-based tracking system is configured to emit a multi-chirp frequency modulated continuous wave (FMCW) radar signal comprising a high-bandwidth chirp and a low-bandwidth chirp to obtain the radar-based measurement data. In some implementations, the high-bandwidth chirp and the low-bandwidth chirp are interleaved to form the multi-chirp FMCW radar signal. In some examples, the multi-chirp FMCW radar signal is emitted by a single radar transmitter. In some instances, the single radar transmitter consumes less than 10 milliwatts to emit the multi-chirp FMCW radar signal. In some implementations, the low-bandwidth chirp comprises a higher transmission power than the high-bandwidth chirp. In some examples, the radar-based measurement data comprises or is based on a reflected multi-chirp FMCW radar signal comprising a reflected high-bandwidth chirp and a reflected low-bandwidth chirp. In some instances, the radar-based tracking system is one of a plurality of radar-based tracking systems, each being associated with a respective detection region.

Act 304 of flow diagram 300 includes utilizing the radar-based measurement data as input to an event detection module to generate event detection output. In some implementations, the event detection output comprises high-bandwidth event detection output generated based on the reflected high-bandwidth chirp and low-bandwidth event detection output generated based on the reflected low-bandwidth chirp. In some examples, the high-bandwidth event detection output is associated with one or more shoulders, elbows, or hands of a user. In some instances, the low-bandwidth event detection output is associated with one or more legs or feet of the user.

Act 306 of flow diagram 300 includes, when the event detection output satisfies one or more conditions, selectively activating an image-based tracking system to enable acquisition of image-based tracking data to facilitate positional tracking of an object. In some implementations, the one or more conditions comprise the event detection output indicating changing of a pose of the object. In some examples, the one or more conditions comprise the event detection output indicating a pose of the object being within, in proximity to, or approaching a range of perception of the image-based tracking system.

Act 308 of flow diagram 300 includes, when the event detection output fails to satisfy the one or more conditions, selectively refraining from activating the image-based tracking system.

Act 310 of flow diagram 300 includes, after selectively activating the image-based tracking system, and when the event detection output fails to satisfy the one or more conditions, selectively deactivating the image-based tracking system.

Act 402 of flow diagram 400 of FIG. 4 includes obtaining, via a radar-based tracking system, radar-based measurement data. In some instances, the radar-based tracking system is configured to emit a multi-chirp frequency modulated continuous wave (FMCW) radar signal comprising a high-bandwidth chirp and a low-bandwidth chirp to obtain the radar-based measurement data. In some implementations, the high-bandwidth chirp and the low-bandwidth chirp are interleaved to form the multi-chirp FMCW radar signal.

Act 404 of flow diagram 400 includes obtaining, via a pose tracking system, system pose data.

Act 406 of flow diagram 400 includes utilizing the radar-based measurement data and the system pose data as input to an event detection module to generate event detection output.

Act 408 of flow diagram 400 includes, when the event detection output satisfies one or more conditions, selectively activating an image-based tracking system to enable acquisition of image-based tracking data to facilitate positional tracking of an object.

Act 410 of flow diagram 400 includes, when the event detection output fails to satisfy the one or more conditions, selectively refraining from activating the image-based tracking system.

Act 412 of flow diagram 400 includes, after selectively activating the image-based tracking system, and when the event detection output fails to satisfy the one or more conditions, selectively deactivating the image-based tracking system.

Act 502 of flow diagram 500 of FIG. 5 includes obtaining, via a plurality of radar-based tracking systems, radar-based measurement data.

Act 504 of flow diagram 500 includes obtaining, via a simultaneous localization and mapping system, system pose data.

Act 506 of flow diagram 500 includes utilizing the radar-based measurement data and the system pose data as input to an event detection module to generate event detection output.

Act 508 of flow diagram 500 includes, when the event detection output satisfies one or more conditions, selectively activating an image-based tracking system to enable acquisition of image-based tracking data to facilitate positional tracking of an object.

Act 510 of flow diagram 500 includes, when the event detection output fails to satisfy the one or more conditions, selectively refraining from activating the image-based tracking system.

Act 512 of flow diagram 500 includes, after selectively activating the image-based tracking system, and when the event detection output fails to satisfy the one or more conditions, selectively deactivating the image-based tracking system.

Additional Details Related to the Disclosed Embodiments

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A system, comprising:

a radar-based tracking system configured to emit a multi-chirp frequency modulated continuous wave (FMCW) radar signal comprising a high-bandwidth chirp and a low-bandwidth chirp;

an image-based tracking system comprising one or more image sensors and one or more processing modules;

one or more processors; and one or more computer-readable recording media that store instructions that are executable by the one or more processors to configure the system to:

obtain, via the radar-based tracking system, radar-based measurement data, wherein the radar-based measurement data comprises or is based on a reflected multi-chirp FMCW radar signal comprising a reflected high-bandwidth chirp and a reflected low-bandwidth chirp;

utilize the radar-based measurement data to generate event detection output wherein the event detection output comprises high-bandwidth event detection output generated based on the reflected high-bandwidth chirp and low-bandwidth event detection output generated based on the reflected low-bandwidth chirp, and wherein the high-bandwidth event detection output is associated with event occurrence within a threshold distance to the radar-based tracking system and the low-bandwidth event detection output is associated with event occurrence outside of the threshold distance; and when the event detection output satisfies one or more conditions, selectively activate the image-based tracking system by causing the one or more processing modules to perform feature extraction on imagery captured via the one or more image sensors to acquire image-based tracking data to facilitate positional tracking of an object over time.

2. The system of claim 1, wherein the one or more conditions comprise the event detection output indicating changing of a pose of the object.

3. The system of claim 1, wherein the one or more conditions comprise the event detection output indicating a pose of the object being within, in proximity to, or approaching a range of perception of the image-based tracking system.

4. The system of claim 1, wherein the high-bandwidth chirp and the low-bandwidth chirp are interleaved to form the multi-chirp FMCW radar signal.

5. The system of claim 1, wherein the multi-chirp FMCW radar signal is emitted by a single radar transmitter.

6. The system of claim 5, wherein the single radar transmitter consumes less than 10 milliwatts to emit the multi-chirp FMCW radar signal.

7. The system of claim 1, wherein the low-bandwidth chirp comprises a higher transmission power than the high-bandwidth chirp.

8. The system of claim 1, wherein the high-bandwidth event detection output is associated with one or more shoulders, elbows, or hands of a user, and wherein the low-bandwidth event detection output is associated with one or more legs or feet of the user.

9. The system of claim 1, further comprising one or more additional radar-based tracking systems, wherein the radar-based tracking system and each of the one or more additional radar-based tracking systems is associated with a respective detection region.

10. The system of claim 1, wherein the instructions are executable by the one or more processors to configure the system to:

when the event detection output fails to satisfy the one or more conditions, selectively refrain from activating the image-based tracking system.

11. The system of claim 1, wherein the instructions are executable by the one or more processors to configure the system to:

after selectively activating the image-based tracking system, and when the event detection output fails to satisfy the one or more conditions, selectively deactivate the image-based tracking system.

12. The system of claim 1, further comprising a second image-based tracking system, wherein the event detection output satisfying the one or more conditions comprises the high-bandwidth event detection output, and wherein the instructions are executable by the one or more processors to configure the system to:

when the low-bandwidth event detection output satisfies a second set of one or more conditions, selectively activate the second image-based tracking system to enable acquisition of image-based tracking data to facilitate positional tracking of a second object.

13. The system of claim 1, wherein the image-based tracking system comprises a hand tracking system, and wherein the object comprises one or more hands of a user.

14. A system, comprising:

a radar-based tracking system configured to emit a multi-chirp frequency modulated continuous wave (FMCW) radar signal comprising a high-bandwidth chirp and a low-bandwidth chirp;

an inertial tracking system;

an image-based tracking system;

one or more processors; and one or more computer-readable recording media that store instructions that are executable by the one or more processors to configure the system to:

obtain, via the radar-based tracking system, radar-based measurement data, wherein the radar-based measurement data comprises or is based on a reflected multi-chirp FMCW radar signal comprising a reflected high-bandwidth chirp and a reflected low-bandwidth chirp;

obtain, via the inertial tracking system, system pose data;

utilize both (i) the radar-based measurement data and (ii) the system pose data obtained via the inertial tracking system as inputs to generate event detection output wherein the event detection output comprises high-bandwidth event detection output generated based on the reflected high-bandwidth chirp and low-bandwidth event detection output generated based on the reflected low-bandwidth chirp, and wherein the high-bandwidth event detection output is associated with event occurrence within a threshold distance to the radar-based tracking system and the low-bandwidth event detection output is associated with event occurrence outside of the threshold distance; and when the event detection output satisfies one or more conditions, selectively activate the image-based tracking system to enable acquisition of image-based tracking data to facilitate positional tracking of an object.

15. The system of claim 14, wherein the high-bandwidth chirp and the low-bandwidth chirp are interleaved to form the multi-chirp FMCW radar signal.

16. The system of claim 14, wherein the instructions are executable by the one or more processors to configure the system to:

when the event detection output fails to satisfy the one or more conditions, selectively refrain from activating the image-based tracking system.

17. The system of claim 14, wherein the instructions are executable by the one or more processors to configure the system to:

after selectively activating the image-based tracking system, and when the event detection output fails to satisfy the one or more conditions, selectively deactivate the image-based tracking system.

18. The system of claim 14, wherein the radar-based measurement data comprises first object pose data for a first object within the threshold distance to the radar-based tracking system and second object pose data for a second object outside of the threshold distance.

19. The system of claim 18, wherein the first object pose data is associated with one or more shoulders, elbows, or hands of a user, and wherein the second object pose data is associated with one or more legs or feet of the user.

20. A head-mounted display, comprising:

a plurality of radar-based tracking systems, each of the plurality of radar-based tracking systems being associated with a respective detection region, wherein at least one of the plurality of radar-based tracking systems is configured to emit a multi-chirp frequency modified continuous wave (FMCW) radar signal comprising a high-bandwidth chirp and a low-bandwidth chirp;

a simultaneous localization and mapping system;

an image-based tracking system;

one or more processors; and one or more computer-readable recording media that store instructions that are executable by the one or more processors to configure the head-mounted display to:

obtain, via the plurality of radar-based tracking systems, radar-based measurement data, wherein the radar-based measurement data comprises or is based on a reflected multi-chirp FMCW radar signal comprising a reflected high-bandwidth chirp and a reflected low-bandwidth chirp;

obtain, via the simultaneous localization and mapping system, system pose data, wherein the system pose data comprise 6-degree-of-freedom pose data for the head-mounted display;

utilize both (i) the radar-based measurement data and (ii) the system pose data obtained via the simultaneous localization and mapping system as inputs to generate event detection output wherein the event detection output comprises high-bandwidth event detection output generated based on the reflected high-bandwidth chirp and low-bandwidth event detection output generated based on the reflected low-bandwidth chirp, and wherein the high-bandwidth event detection output is associated with event occurrence within a threshold distance to the radar-based tracking system and the low-bandwidth event detection output is associated with event occurrence outside of the threshold distance;

when the event detection output satisfies one or more conditions, selectively activate the image-based tracking system to enable acquisition of image-based tracking data to facilitate positional tracking of an object;

when the event detection output fails to satisfy the one or more conditions, selectively refrain from activating the image-based tracking system; and after selectively activating the image-based tracking system, and when the event detection output fails to satisfy the one or more conditions, selectively deactivate the image-based tracking system.

* * * * *